(12) United States Patent
Chen (10) Patent No.: US 7,742,061 B2
(45) Date of Patent: Jun. 22, 2010

(54) METHOD AND RELATED APPARATUS FOR IMAGE PROCESSING

(75) Inventor: Yi-Peng Chen, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 658 days.

(21) Appl. No.: 11/552,984

(22) Filed: Oct. 26, 2006

(65) Prior Publication Data

US 2007/0206027 A1  Sep. 6, 2007

(30) Foreign Application Priority Data

Mar. 6, 2006  (TW) .............................. 95107383 A (51) Int. Cl.
*G09G 5/00* (2006.01)
(52) U.S. Cl. .................... 345/620; 345/421; 345/581
(58) Field of Classification Search .............. 345/620, 345/421, 581
See application file for complete search history.

(56) References Cited

U.S. PATENT DOCUMENTS

| | | | | |
|---|---|---|---|---|
| 3,889,107 | A * | 6/1975 | Sutherland | 345/623 |
| 4,958,305 | A * | 9/1990 | Piazza | 345/427 |
| 5,303,340 | A * | 4/1994 | Gonzalez-Lopez et al. | 345/441 |
| 5,757,321 | A * | 5/1998 | Billyard | 345/426 |
| 5,767,859 | A * | 6/1998 | Rossin et al. | 345/620 |
| 5,777,625 | A * | 7/1998 | Rossin | 345/620 |
| 5,877,773 | A * | 3/1999 | Rossin et al. | 345/621 |
| 6,559,842 | B1 | 5/2003 | Deering | |
| 6,600,485 | B1 * | 7/2003 | Yoshida et al. | 345/419 |
| 6,693,639 | B2 * | 2/2004 | Duluk et al. | 345/506 |
| 6,961,065 | B2 * | 11/2005 | Sasaki | 345/582 |
| 7,106,324 | B1 * | 9/2006 | Takahashi | 345/423 |
| 7,167,181 | B2 * | 1/2007 | Duluk et al. | 345/506 |
| 7,292,242 | B1 * | 11/2007 | Wittenbrink et al. | 345/421 |
| 7,315,310 | B2 * | 1/2008 | Sakamoto et al. | 345/620 |
| 7,446,770 | B2 * | 11/2008 | Kokojima et al. | 345/441 |
| 7,589,746 | B2 * | 9/2009 | Heim et al. | 345/623 |
| 7,616,218 | B1 * | 11/2009 | Parikh et al. | 345/620 |
| 2002/0030693 | A1 * | 3/2002 | Baldwin | 345/620 |
| 2003/0067468 | A1 * | 4/2003 | Duluk et al. | 345/506 |
| 2003/0095137 | A1 * | 5/2003 | Lu et al. | 345/660 |

(Continued)

FOREIGN PATENT DOCUMENTS

CN  1104792 A  7/1995

(Continued)

OTHER PUBLICATIONS

Mason Woo, et al., "OpenGL Programming Guid". p. 223-247, Aug. 2001.

(Continued)

*Primary Examiner*—M Good Johnson
(74) *Attorney, Agent, or Firm*—Winston Hsu (57) ABSTRACT

Method and related apparatus for image processing. When projecting a polygonal object in three-dimensional space onto a two-dimensional screen according to a viewing range, faces of the object which intersect boundaries of the viewing range are clipped to form clipped planes. Vertices of all of the clipped planes of the object are recorded in one vertex list according to a triangle-list primitive, so as to increase efficiency of the image processing.

13 Claims, 11 Drawing Sheets

U.S. PATENT DOCUMENTS

| | | | |
|---|---|---|---|
| 2004/0130552 A1* | 7/2004 | Duluk et al. | 345/506 |
| 2004/0263520 A1* | 12/2004 | Wasserman et al. | 345/506 |
| 2004/0263534 A1 | 12/2004 | Poddar | |
| 2007/0222795 A1* | 9/2007 | Heim et al. | 345/621 |

FOREIGN PATENT DOCUMENTS

| | | |
|---|---|---|
| TW | 548556 | 8/2003 |
| TW | 577027 | 2/2004 |
| TW | 1231906 | 5/2005 |

OTHER PUBLICATIONS

OpenGL Programming Guide -PND23406, Chapter 7, Aug. 2001.

* cited by examiner

METHOD AND RELATED APPARATUS FOR IMAGE PROCESSING

CROSS-REFERENCE TO RELATED APPLICATIONS

The present application claims the benefit of priority of Taiwan Patent Application 095107383; filed Mar. 6, 2006.

BACKGROUND OF THE INVENTION

1. Field of the Invention

The present invention provides a method and related apparatus for image processing, and in particular, a method and related apparatus for clipping a three-dimensional object according to a viewing range and recording vertices after clipping in a better primitive, and hence improving image processing performance.

2. Description of the Prior Art

Presenting various documents, information, results and data with graphics makes browsing, viewing, observing and arranging easy for users. This has also become one of the most important functions of a modern computer system. Virtual reality graphical presentation allows the users to view a three-dimensional (3D) object, which plays an important role in fields of medical images, Computer-Aided Design/Computer-Aided Manufacture (CAD/CAM), virtual reality (such as flight simulation), multimedia games, etc. Thus, virtual reality 3D graphical presentation technologies are one research emphasis of a modern information industry.

In techniques of presenting 3D graphics, 3D objects and scenes in a virtual 3D space are processed to have the objects and scenes projected and displayed on a two-dimensional (2D) screen. The 2D screen can be equivalently seen as a photo of the 3D space which is taken by a virtual camera. Viewing graphics displayed on the 2D screen is just like observing the objects and scenes through a 2D image (i.e. a photograph) taken by a virtual camera. And in this way, the prior art can realize graphical representations of the virtual reality.

In modern techniques of presenting 3D space, a 3D object in a virtual 3D space can be formed with many faces, so the 3D object is also called a polygonal object. In fact, due to a special geometric characteristic of a triangle, i.e. that three vertices are always coplanar, faces of a 3D object are divided into one or more triangular planes with a triangle as a primitive. Finally the 3D object takes the triangular plane as a primary structural unit; the 3D object is formed by assembling all of the triangular planes. Since a location of a triangular plane can be defined by coordinates of its three vertices, a location and volume of an object occupying a 3D space can be represented with a vertex list that compiles the coordinates of each triangular plane of an object.

Figure 1:
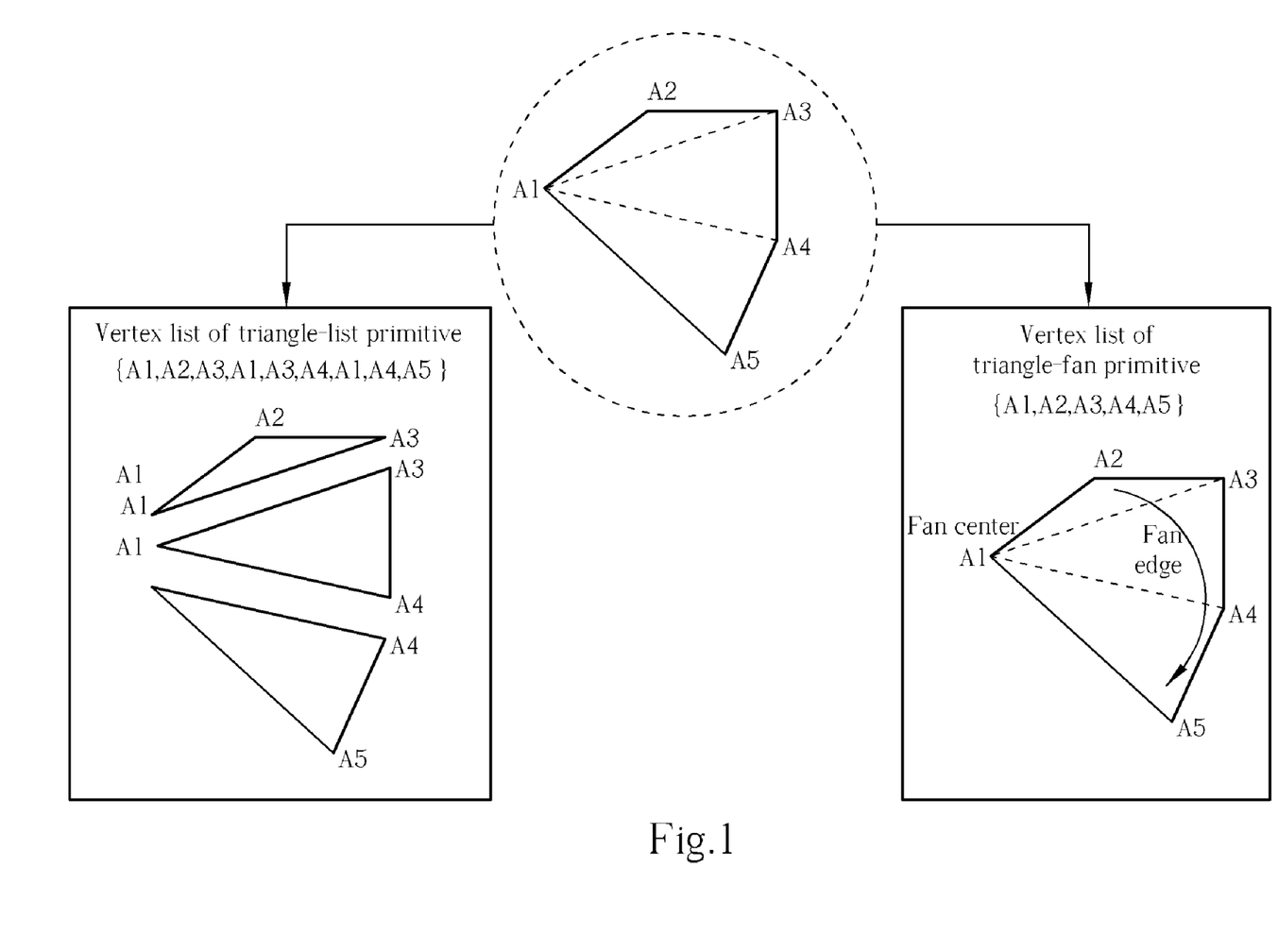
FIG. 1 is a diagram of recording vertices in a vertex list based on different primitives according to the prior art.

For people who are familiar with the art, when forming planes of any shape or 3D objects with combinations of triangular planes, since different triangular planes typically align together to form particular primitives, when recording the vertices of the triangular planes from the combinations of the triangular planes in the vertex list, the vertices can be recorded in different primitives according to different modes and sequences in a same list. Please refer to FIG. 1. FIG. 1 represents how to record vertices of a polygon in a vertex list with different primitives. FIG. 1 shows a pentagon as an example. The pentagon has four vertices A1 to A5, which can be divided into three triangular planes as shown. When describing the pentagon with vertices of the triangular planes, the three triangular planes can be seen as three independent triangles. Therefore, according to a triangle-list primitive, coordinates of the vertices are recorded in a vertex list as {A1, A2, A3, A1, A3, A4, A1, A4, A5}, which is simply recording the vertices of each triangle sequentially. On the other hand, the three triangular planes can be seen as a triangle-fan primitive since the three triangular planes share a vertex. The triangle-fan has a vertex A1 as its center, and therefore a sequence {A1, A2, A3, A4, A5} is recorded in a vertex list according to the triangle-fan primitive. The triangle-fan primitive takes the vertex A1 as the center of the fan and records each vertex consecutively. Other vertex list primitives include a triangle-stripe, etc.

It can be seen from the above discussion of primitives that given one triangle plane configuration, the vertex list can have different contents if the coordinates of the vertices of the triangles are recorded in the vertex list according to the different primitives. Thus, the vertex list must have a corresponding primitive. When reading the vertex list, the vertex list must be read with respect to a sequence defined by a corresponding primitive, so that a correct description of a polygon or an object can be obtained from the vertex list.

By describing objects and scenes in a virtual 3D space with vertex lists, and appropriately processing each vertex list, a position of each vertex as it is projected on a 2D screen can be calculated. Effectively projecting the 3D space on the 2D screen is equivalent to forming an image on the 2D screen by a virtual camera.

However, like a real camera, the virtual camera also has a specific viewing range. For example, an object placed right in front of the camera is projected in the center of a photo (a 2D screen), while an object placed at the left/right side of the camera may not be captured by the camera and hence may not be presented in the photo. An object that extends from the front of the camera to the left/right side of the camera is only presented partially in the photo; the rest of the object is outside the viewing range and hence not shown in the photo.

Similarly, in 3D graphics presentation techniques, when projecting a 3D object onto a 2D screen, it is necessary to calculate whether the object lies in a range of a virtual camera. If an object lies completely outside the viewing range, that means the object would not be projected in a photo (2D screen), and that further means there is no need to process a redundant calculation for the object outside the viewing range during image processing. Correspondingly, if an object lies partially inside the viewing range and partially outside the viewing range, a clipping procedure is executed on the object to keep a portion of the object that is captured inside the viewing range and only project the portion kept onto the 2D screen.

Clipping an object in a 3D space according to a viewing range involves clipping triangular planes since the object is constructed with triangular planes. If the object extends across the viewing range, then one or more triangular planes will intersect with boundaries of the viewing range, meaning these triangular planes comprise some vertices inside the viewing range and some vertices outside the viewing range. For instance, if a triangular plane comprises a vertex outside of the viewing range, after clipping, the triangular plane is clipped to form a clipped plane that might be a quadrangle or a pentagon. By replacing triangular planes of the object that extends across the viewing range with clipped planes, and discarding triangular planes that lie completely outside the viewing range, triangular planes that are originally inside the viewing range are kept, and hence a clipping process of the object is completed.

As discussed above, to project an object in a 3D space onto a 2D screen, the object should be constructed with triangular planes. So when processing clipping as described above, clipped planes formed after clipping still need to be divided into triangular planes, and further, vertices of the triangular planes need to be recorded. For example, if a triangular plane is clipped to form a quadrangle clipped plane, the clipped plane will be divided further into two triangular planes. Therefore, the clipped plane is represented by the two triangular planes.

In the image processing techniques of the prior art, when recording the vertices of the triangular planes of each clipped plane, the vertices of each clipped plane are recorded in a vertex list as a triangle-fan primitive. In other words, if an object comprises N triangular planes crossing in and out of the viewing range, after clipping the N triangular planes into N clipped planes, the prior art records the vertices of each clipped plane corresponding to N triangle-fan primitives in vertex lists.

After completing the clipping procedure, the 3D graphics presentation technique can perform pixel-level processing to calculate an image that will be presented on the 2D screen by each triangular plane of the object. Since the 2D screen may present images with pixels as units, when performing the pixel-level processing, numbers of pixels occupied by each triangular plane can be calculated, along with a color, brightness, and texture thereof.

During practical pixel-level processing, the process receives vertex lists corresponding to each object, reads/connects corresponding triangular planes according to a primitive corresponding to each vertex list, and perform relative calculations for the 2D screen according to positions of the triangular planes. However, because the prior art uses a plurality of vertex lists to describe a plurality of clipped planes, processing efficiency is affected during pixel-level processing.

As mentioned above, when reading a vertex list, a reading order must be set according to a primitive corresponding to the vertex list first, and so as to an original plane can be correctly formed by connecting vertices. However, the process of setting the reading order consumes a large amount of system resources. In particular, because the prior art generates a plurality of vertex lists for a plurality of clipped planes when clipping an object, the result is that the setting and reading processes are repeated many times for each vertex list, which increases the system resources consumed and affects processing efficiency.

For example, a modern computer system usually uses graphics processing hardware to realize pixel-level processing, wherein pipeline processing hardware is used to read vertex lists. Since the prior art records vertices of different clipped planes in many vertex lists when processing the vertices of the clipped planes, the pipeline processing hardware must repeatedly flush the pipeline when reading each vertex list before it can perform setting of the reading order, which brings down the overall graphics processing performance.

SUMMARY OF THE INVENTION

A method of graphics processing for projecting a three-dimensional (3D) image on a two-dimensional (2D) screen is provided. At least one object is formed with at least one plane existing in 3D space. The method comprises setting a viewing range and boundaries which enclose the viewing range; clipping by checking if any face of the object is intersecting with the boundaries, and if so, calculating an intersecting plane of the object face and the viewing range, so that the intersecting plane is a clipped plane corresponding to the object face, and each clipped plane has a plurality of vertices; and after performing clipping of an object and at least one clipped plane is calculated, integrating by recording vertices of all clipped planes onto a same vertex list in accordance to a primitive of a triangle-list, such that vertices of the clipped planes are represented with the vertex list.

An electronic device for image processing, which projects a three-dimensional (3D) image onto a two-dimensional (2D) screen, is provided. At least one object is formed with at least one plane existing in 3D space. The electronic device comprises a viewing module, a clipping module, and an integrating module. The viewing module is configured for setting a viewing range and boundaries which enclose the viewing range. The clipping module is configured for clipping by checking if any face of the object intersects with the boundaries, and if so, calculating an intersecting plane of the object face and the viewing range, so that the intersecting plane is a clipped plane corresponding to the object face, and each clipped plane has a plurality of vertices. The integrating module is configured for recording the vertices of all clipped planes in a same vertex list in accordance with a triangle-list primitive after performing clipping of the object and calculating at least one clipped plane from the object, such that vertices of the clipped planes are represented in the same vertex list.

These and other concepts and techniques will no doubt become obvious to those of ordinary skill in the art after reading the following detailed description of the preferred embodiment that is illustrated in the various figures and drawings.

DETAILED DESCRIPTION

Figure 2:
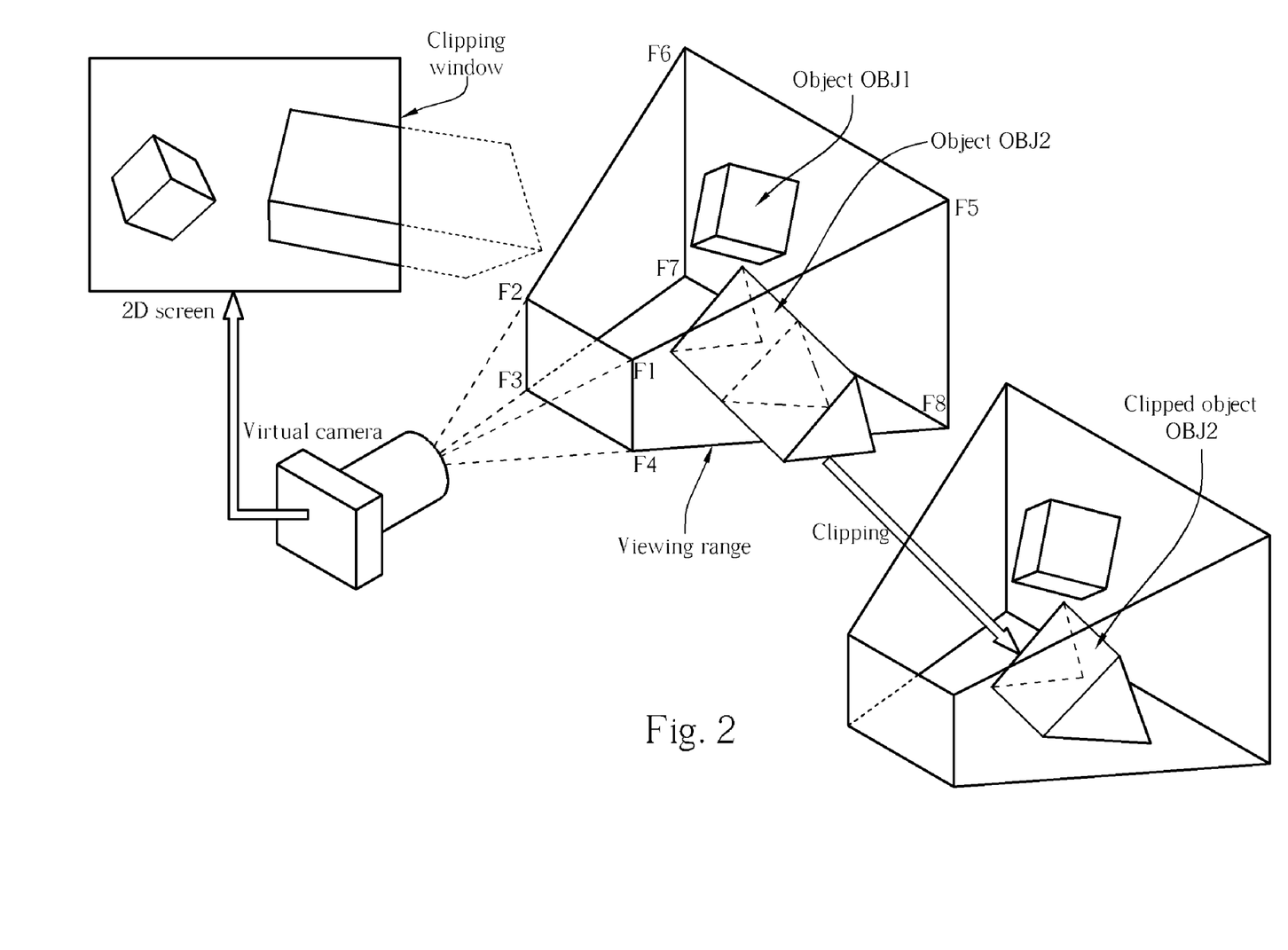
FIG. 2 is a diagram of displaying a 3D space on a 2D screen.

Please refer to FIG. 2. FIG. 2 is a diagram of presenting graphics in a 3D space. When presenting a virtual 3D object and scene on a 2D screen, it is equivalent to taking a photo of the 3D object with a virtual camera, and the resulting photo is an image represented on the 2D screen. But, like a real camera, the virtual camera also has a certain viewing range. As shown in FIG. 2, a space surrounded by vertices F1 to F8 is a viewing range. The viewing range comprises four planes: plane F1-F4-F8-F5, plane F1-F5-F6-F2, plane F2-F6-F7-F3, and plane F3-F7-F8-F4. Additionally, there are a close plane F1-F2-F3-F4 and a far plane F6-F5-F8-F7 of the virtual camera. Boundaries of the viewing range are defined by the six planes. When projecting a 3D space onto a 2D screen, the surrounding four planes (plane F1-F4-F8-F5, plane F1-F5-F6-F2, plane F2-F6-F7-F3, and plane F3-F7-F8-F4) define the boundaries of the viewing range on the 2D screen, and this is also called a clipping window.

For example, an object OBJ1 in FIG. 2 lies completely within a viewing range, so that when projecting a 3D space to a 2D screen, an image of the object OBJ1 lies completely inside the clipping window. In contrast, a portion of an object OBJ2 lies outside the viewing range, and the portion outside the clipping window therefore is not displayed on the 2D screen. Thus, when performing image processing and projecting the 3D space onto the 2D screen, the object OBJ2 is clipped first, then the portion that is outside the viewing range is discarded. After that, pixel-level processing is performed.

Figure 3:
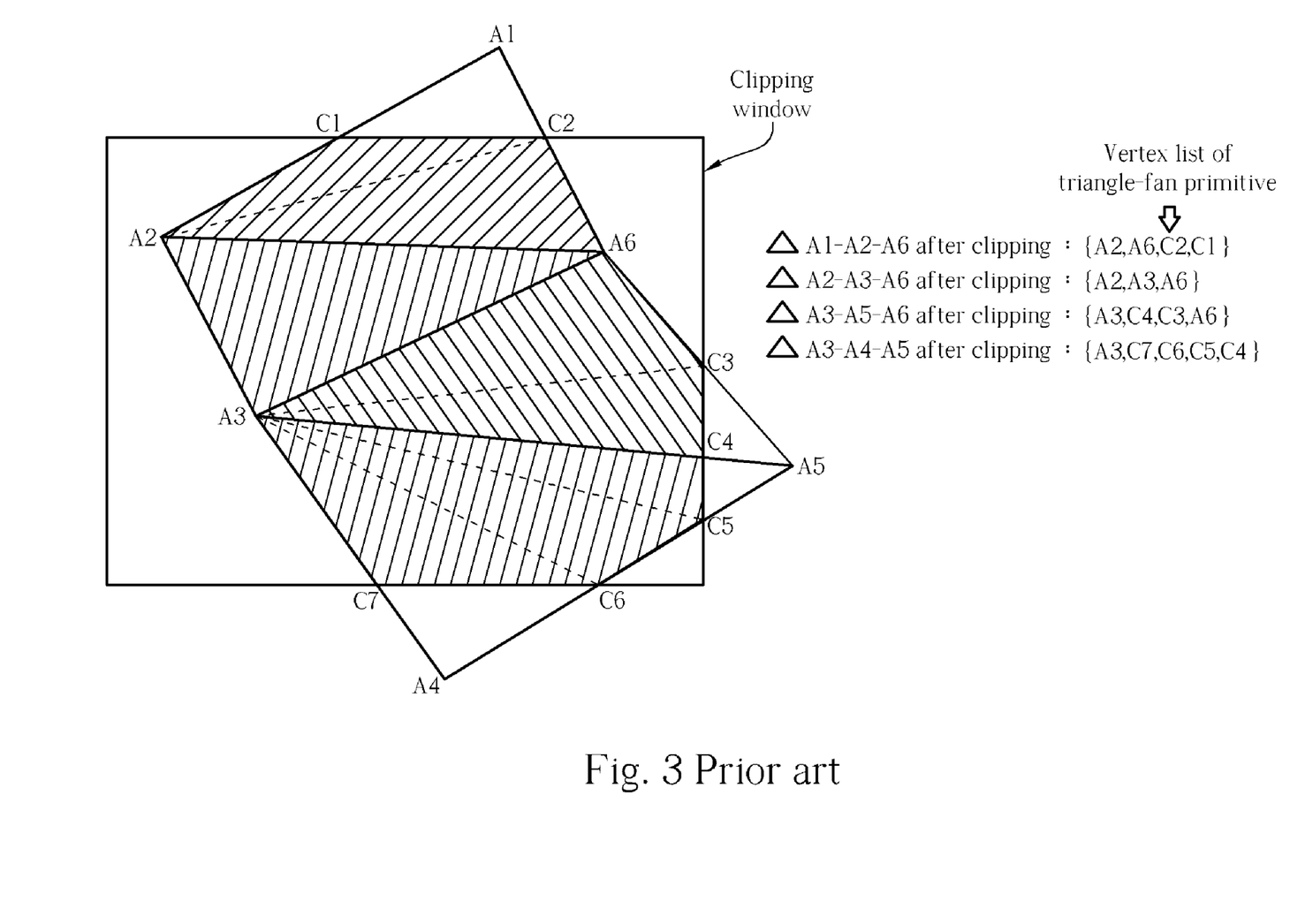
FIG. 3 is a diagram of clipping an object according to the prior art.

Please refer to FIG. 3. FIG. 3 is a diagram of a clipping process performed on an object according to image processing of the prior art. In FIG. 3, assuming that an object to be clipped comprises four triangular planes, the four triangular planes have vertices A1-A2-A6, vertices A2-A3-A6, vertices A3-A5-A6, and vertices A3-A4-A5, respectively. Since the vertices A1, A4 and A5 lie outside of the boundaries of the viewing range, i.e. the clipping window, the object needs to be clipped to find an intersection of each triangular plane and the viewing range, i.e., portions of each triangular plane that are inside the viewing range. As shown in FIG. 3, the triangular plane A1-A2-A6 and the triangular plane A3-A5-A6 are clipped to form quadrangular clipped planes, and the triangular plane A3-A4-A5 is clipped to form a pentagonal clipped plane. The triangular plane A2-A3-A6 lies completely within the viewing range, and therefore is not clipped. After clipping, a plurality of post-clipping vertices C1-C7 are formed.

In the prior art, the vertices of each clipped plane are recorded to a corresponding vertex list based on a triangle-fan primitive. As the example in FIG. 3 shows, the prior art records clipping results for the four triangular planes in four triangle-fan primitives. For the triangular plane A1-A2-A6, a clipped plane can be recorded in a vertex list as a triangle-fan primitive with vertices {A2, A6, C2, C1}. In the triangle-fan primitive {A2, A6, C2, C1}, the vertex A2 is a center of the triangle-fan, and the post-clipping vertices C2, C1 and the vertex A6 are vertices on edges of the fan shape. Similarly, for the triangular plane A3-A5-A6, coordinates of the vertices can be recorded after clipping in a vertex list {A3, C4, C3, A6}. For the triangular plane A3-A4-A5, the pentagonal plane formed by clipping can be divided into three triangular planes in a triangle-fan arrangement. Taking the vertex A3 as a center of the triangle-fan, coordinates of the vertices can be recorded in a vertex list {A3, C7, C6, C5, C4}.

Because the prior art records the coordinates of the vertices of each clipped plane in the respective vertex list based on the triangle-fan primitive, triangular planes with different clipped planes and non-triangle-fan primitive arrangements cannot be integrated and recorded in the same vertex list. In the example of FIG. 3, the clipped plane A2-A6-C2-C1 and the clipped plane A3-C4-C3-A6 only share the vertex A6 but have no shared edges. Thus, no matter how the two clipped planes are divided, a series of triangular planes in a fan arrangement cannot be generated. Therefore, the prior art cannot record the coordinates of the vertices of the two clipped planes in the same vertex list with the same triangle-fan primitive.

Figure 4:
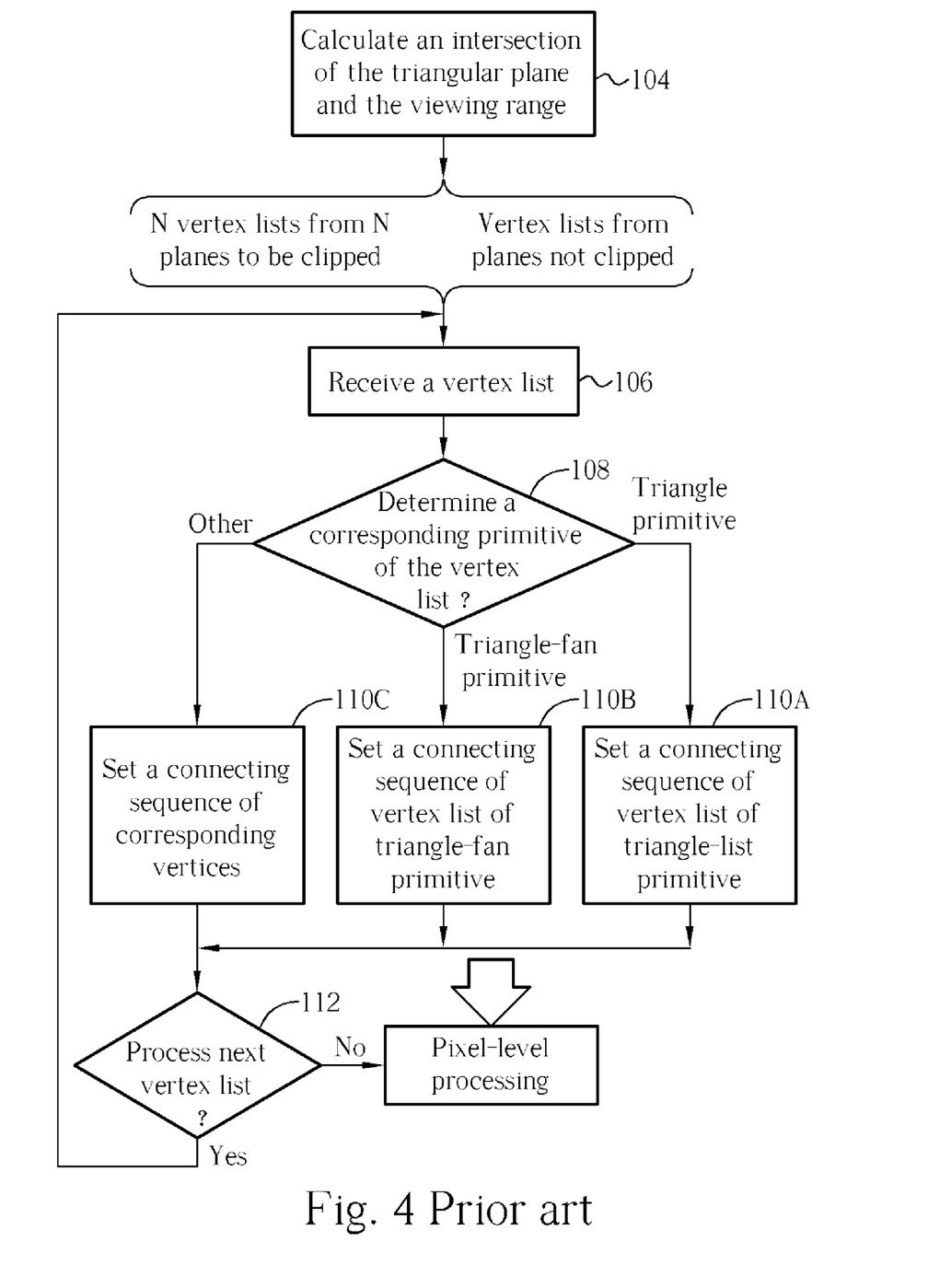
FIG. 4 is a flowchart of clipping and setup procedures according to the prior art.

As discussed above, after object clipping, pixel-level processing is performed on the vertex lists generated by clipping. However, before reading the vertex lists and performing the pixel-level processing, a setup procedure is required to set a reading sequence for the vertex lists according to the primitives of the vertex lists. Please refer to FIG. 4. FIG. 4 is a flowchart of procedures for clipping and setup processes according to the prior art. The procedures in FIG. 4 comprise the following steps:

Step 104: Execute a clipping process, and calculate whether boundaries of a viewing range intersect with each triangular plane of the object; if so, the triangular plane needs to be clipped to form a clipped plane; then, calculate an intersection of the triangular plane and the viewing range, i.e. find intersecting points of the triangular plane and the boundaries of the viewing range.

After clipping, the prior art records a vertex list for each plane to be clipped, and records the coordinates of each vertex after clipping based on the triangle-fan primitive. After step 104, if an object comprises N planes to be clipped, there will be N corresponding vertex lists. Further, some triangular planes of the objects may be completely inside the viewing range. Vertices of these triangular planes, i.e. the unclipped triangular planes, are recorded in other corresponding vertex lists.

Step 106: Start a setup procedure before pixel-level processing. Receive a vertex list produced by the clipping procedure.

Step 108: Determine a corresponding primitive of the vertex list. If the primitive is a triangle-list primitive, go to step 110A; if the primitive is a triangle-fan primitive, go to step 110B; for other primitives, e.g. a triangle-strip primitive, go to step 110C.

Steps 110A, 110B, 110C: Set a method of connecting the vertices in the vertex list based on the corresponding primitive.

In Steps 110A, 110B, 110C, for example, a vertex list records six vertices {V1, V2, V3, V4, V5, V6}, and if the vertices are recorded as the triangle-list primitive, then the vertices V1-V2-V3 form a triangular plane, and the vertices V4-V5-V6 form another triangular plane. If the vertices are recorded as the triangle-fan primitive, then rebuilding of the triangular planes of the vertex list results in a triangular plane with the vertices V1-V2-V3, a triangular plane with the vertices V1-V3-V4, a triangular plane with the vertices V1-V4-V5, and a triangular plane with the vertices V1-V5-V6. The vertices must be connected/read according to the corresponding primitive in order to rebuild each triangular plane represented by the vertex list correctly, and hence correctly execute pixel-level processing.

Step 12: Determine whether another vertex list setup should be processed. If so, return to Step 106, or go to the next processing for the pixel level.

From FIG. 4, since the prior art produces a plurality of vertex lists (N vertex lists for N planes to be clipped), the prior art performs steps 108 through 110A/110B/110C repeatedly. Since each step consumes system resources, frequent repetition reduces overall image processing efficiency.

Due to the triangle-fan primitive of the prior art, the prior art needs to record a vertex list for each clipped plane, such that the reading process is repeated. To overcome this disadvantage of the prior art, the present invention uses a triangle-list primitive to integrate respective vertices of different clipped planes in a same vertex list, thereby reducing a number of times that the setup process is repeated when reading, and increasing overall performance.

Figure 5:
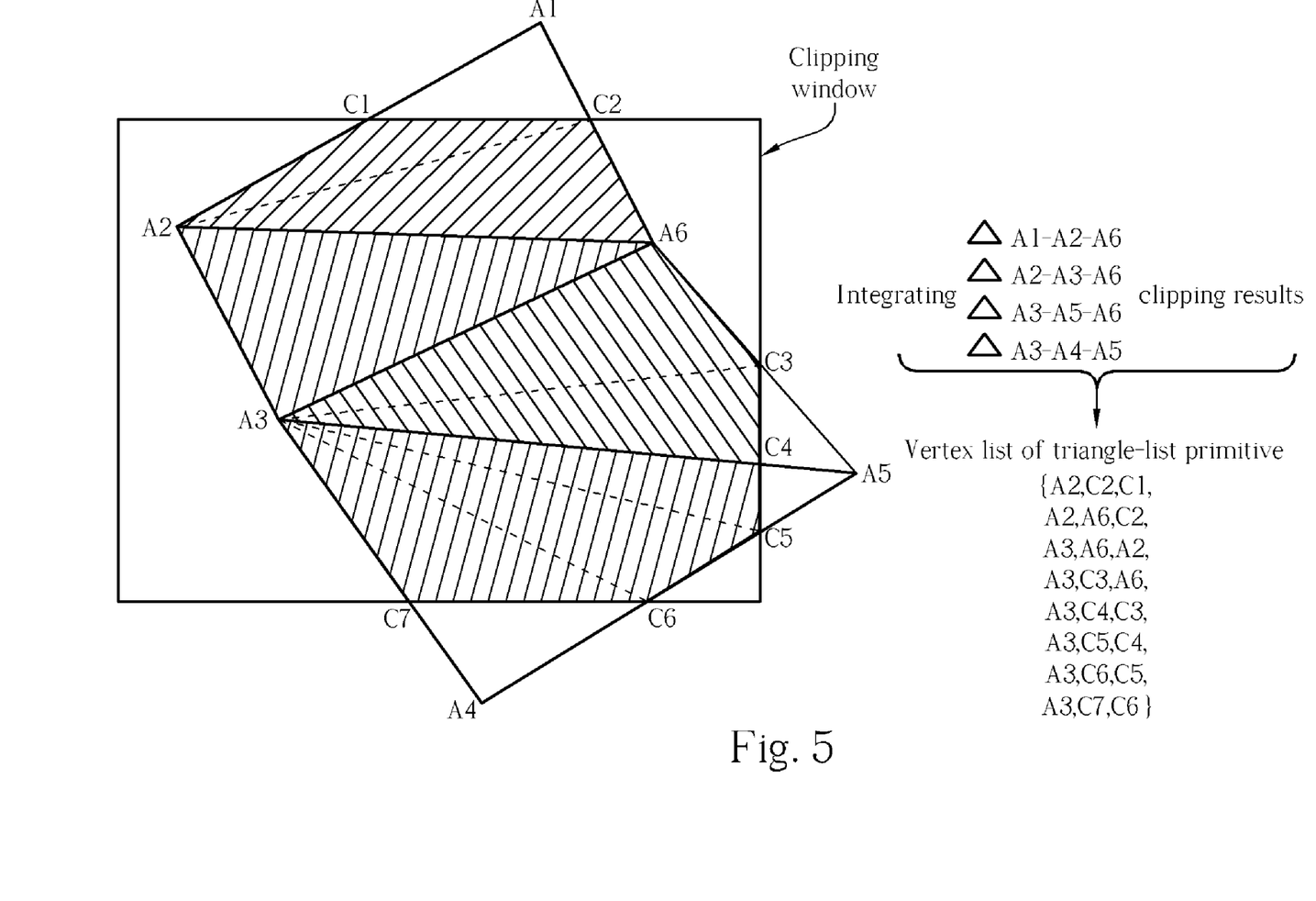
FIG. 5 is a diagram of clipping an object according to the present invention.

Please refer to FIG. 5. FIG. 5 is a diagram of object clipping in the present invention. For simplicity and clarity, FIG. 5 uses the object presented in FIG. 3 to demonstrate the clipping process. The object comprises four triangular planes: A1-A2-

A6, A2-A3-A6, A3-A5-A6 and A3-A4-A5. After clipping, the triangular plane A1-A2-A6 and the triangular plane A3-A5-A6 are clipped to form a quadrangular plane A2-A6-C2-C1 and a quadrangular plane A3-C4-C3-A6, respectively, and the triangular plane A3-A4-A5 is clipped to form a pentagonal plane A3-C7-C6-C5-C4. Each clipped polygon is further divided into triangular planes and recorded in vertex lists.

Different from the prior art, the present invention uses the triangle-list primitive to record the vertices of each clipped plane in the same vertex list. In FIG. 5, the object comprises four clipped planes after clipping. The present invention is able to record all of the vertices of the triangular planes from the four clipped planes after clipping in one vertex list, and a sequence of the vertices in the vertex list is {A2, C2, C1, A2, A6, C2, A3, A6, A2, A3, C3, A6, A3, C4, C3, A3, C5, C4, A3, C6, C5, A3, C7, C6}. In this way, only one vertex list is required to record a result of the clipping, unlike the prior art in FIG. 3, which requires four vertex lists to record all of the vertices. Thus, during later pixel-level processing, the present invention only requires one setup procedure, which reduces repetitions and improves overall performance.

Among all primitives used in vertex lists, the triangle-list primitive is the most flexible. When recording a plurality of triangular planes, the triangle-list primitive vertices list simply needs to record vertices of each triangular plane, without any extra requirement that the triangular plane be arranged according to a certain format. Even if the triangular planes are two separate planes, their respective vertices can also be recorded in one vertex list. The present invention uses this characteristic to integrate vertices from different clipped planes, thereby reducing a number of vertex lists required and a number of times the setup procedure is repeated.

Figure 6:
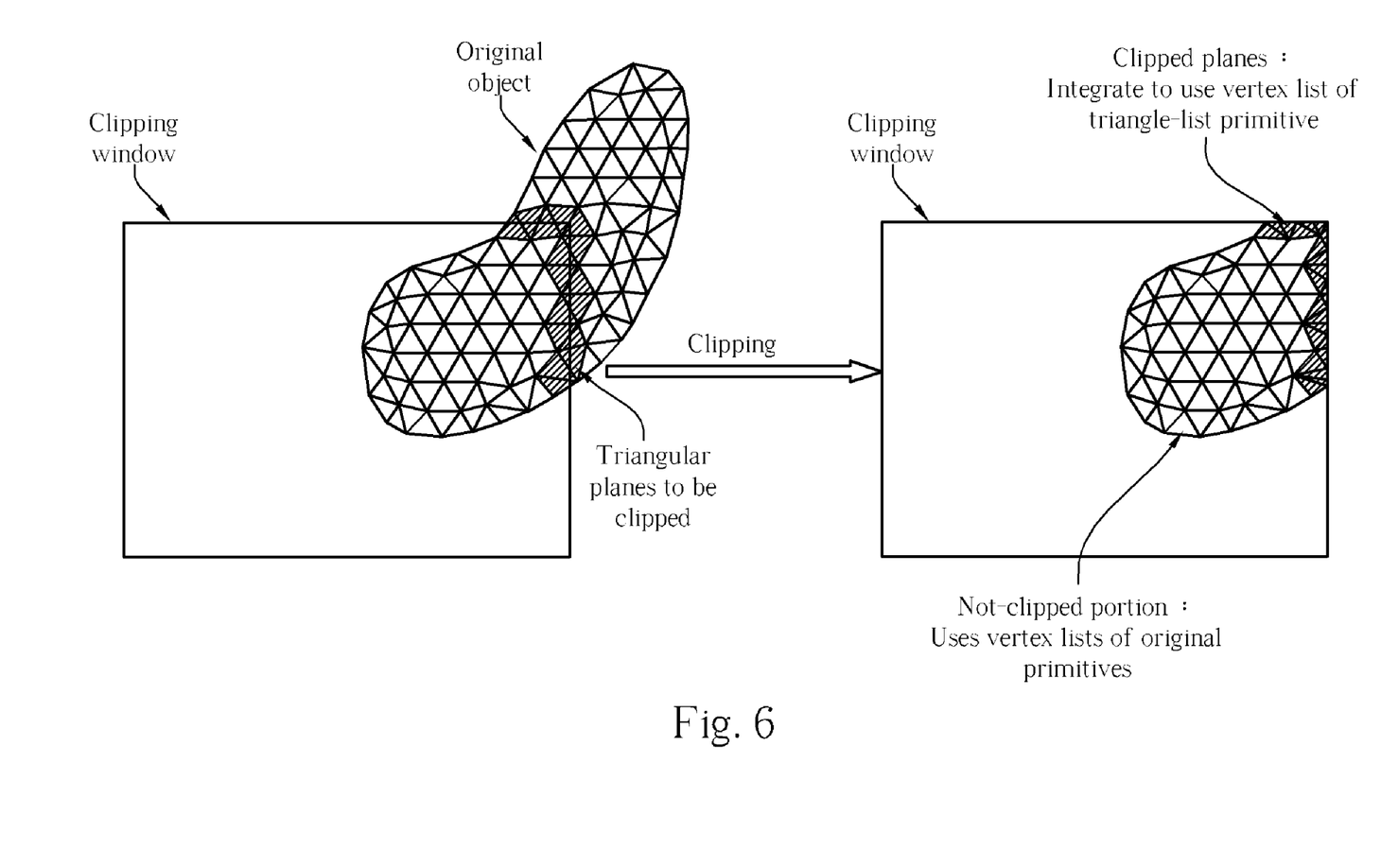
FIG. 6 shows a general rule for object clipping according to the present invention.

Please refer to FIG. 6. FIG. 6 shows a general rule for object clipping in the present invention. When clipping an object, calculations can be done first for each triangular plane to determine whether the triangular plane lies completely inside a viewing range in accordance with coordinates of each triangular plane. For triangular planes that are completely inside the viewing range, there is no clipping required. Triangular planes that are completely outside the viewing range are discarded. Clipping is only required for triangular planes that intersect with boundaries of the viewing range and only portions that are inside the viewing range remain after clipping. After clipping, a plurality of polygonal clipped planes is formed. After dividing the clipped planes into triangular planes, the present invention records the vertices of each triangular plane in one vertex list according to the triangle-list primitive. Portions of the object that do not need to be clipped, i.e. triangular planes that lie completely inside the viewing range, are recorded in vertex lists according to original, i.e. pre-clipping, primitives. For instance, an object may have vertices that are recorded according to the triangle-strip primitive before clipping, and after clipping, vertices of portions of the object that are not clipped are still recorded in the vertex list according to the triangle-strip primitive. A combination of vertex lists for the clipped planes and a vertex list of the portions that do not need to be clipped represents a clipping result of the object.

Figure 7:
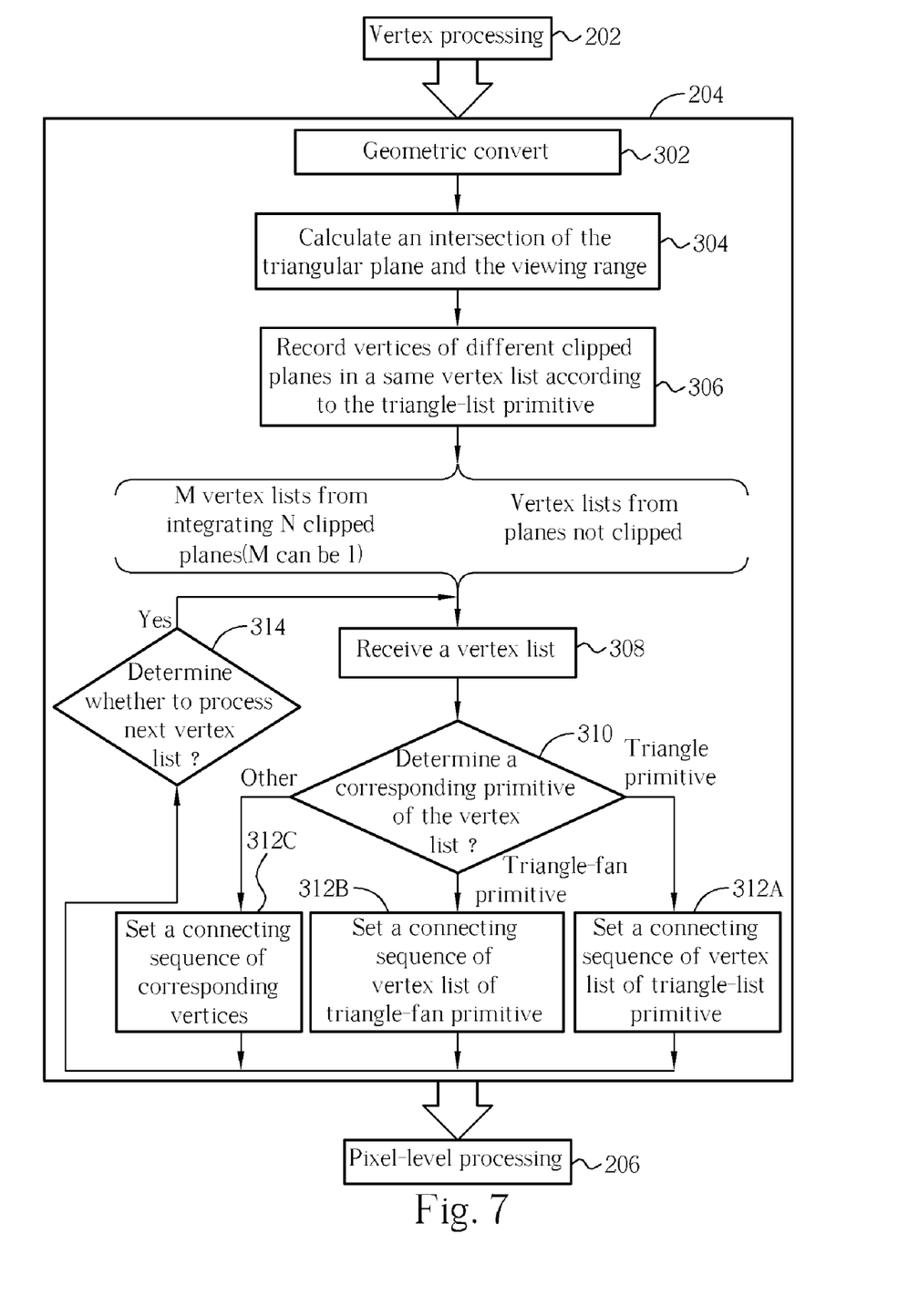
FIG. 7 is a flowchart of procedures for image processing according to the present invention.

Please refer to FIG. 7. FIG. 7 represents procedures for image processing of the present invention. For realizing image processing of 3D images, the procedures in FIG. 7 comprise the following steps:

Step 202: Vertex processing step. This step comprises arranging coordinates of vertices, executing necessary conversions, and determining relative locations of each object in a 3D space. On the other hand, the step also comprises processing/calculating/converting information corresponding to each vertex, such as perpendicular vectors and reflection characteristics, etc.

Step 204: Geometric processing/clipping/setup step. This step comprises the following steps:

Step 302: Geometric conversion. Setup a location and a viewing range of a virtual camera, and use the camera's top/bottom/front/back/left/right as bases to calculate locations of vertices for each object (and information about each vertex).

Step 304: Clipping procedure. Calculate whether a triangular plane lies completely inside the viewing range for each triangular plane of each object. If a triangular plane intersects with boundaries of the viewing range, the clipping procedure is executed on the triangular plane, and vertices of a polygonal clipped plane formed by the clipping (and information about each vertex) are calculated.

Step 306: Integrating procedure. Vertices of different clipped planes are integrated and recorded into a same vertex list according to the triangle-list primitive. If an object comprises N triangular planes after clipping, the present invention can form M vertex lists with M primitives to record the corresponding N clipped planes. In a preferred embodiment of the present invention, M equals 1, which means that the vertices of the N clipped planes of the object are recorded in one vertex list. In addition, the present invention can also use a plurality of vertex lists (no larger than N) to record the vertices of the clipped planes. For instance, for N clipped planes, the vertices of N1 clipped planes are recorded in one vertex list and the vertices of N2 clipped planes (where N1+N2=N) are recorded in the other vertex list. A combination of vertex lists for clipped planes and vertex lists for the portions that do not need to be clipped represents a clipping result of the object.

Step 308: After clipping each object, setup procedures can be carried out for each vertex list for further pixel-level processing. During the setup procedure, a vertex list is received.

Step 310: Execute steps 312A, 312B and 312C according to primitives of the vertex lists to set corresponding connecting sequences.

Step 314: If there is another vertex list to be setup, go back to Step 308. Since the integrating procedure of the present invention reduces the number of vertex lists, the setup procedure (Steps 308/310/312A-C) is repeated less frequently.

Step 206: After setting and reading each vertex list, pixel-level processing is carried out to present each triangular plane on a 2D screen with pixels as units.

Figure 8:
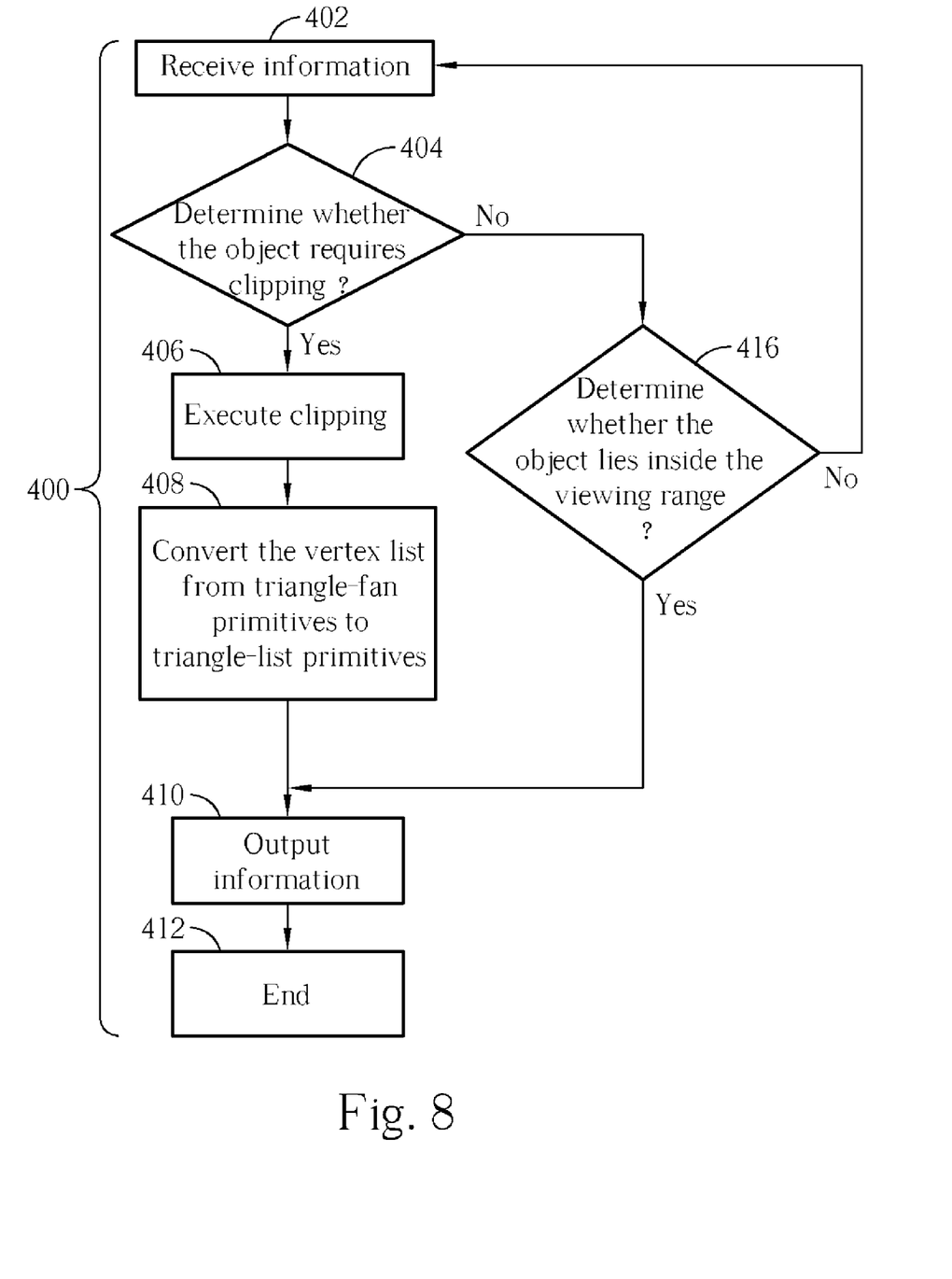
FIG. 8 shows a further procedure of the integrating procedure in FIG. 7.

For further explanation of the present invention, please refer to FIG. 8. According to FIG. 7, a procedure 400 in FIG. 8 further explains steps 304 to 306. The procedure 400 comprises the following steps:

Step 402: Receive information. For instance, receive information about objects from a vertex shader.

Step 404: Determine whether the object requires clipping. If so, go to step 406; if not, go to step 416.

Step 406: Execute clipping. Calculate intersections of each polygon (triangular plane) and the boundaries of the viewing range, and calculate each vertex after clipping. Vertex lists after clipping might be presented in triangle-fan primitives first.

Step 408: Convert the vertex list from the triangle-fan primitives to triangle-list primitives if necessary, i.e. record vertex lists after clipping according to triangle-list primitives.

Step 410: Output information. For example, output vertex lists of clipped planes in the triangle-list primitives to a vertex shader.

Step 412: End the procedure 400.

Step 416: If an object does not need to be clipped, determine whether the object lies inside the viewing range. If not, no image processing is required to be done to the object, and go to Step 402 for the next object. If so, then the object lies inside the viewing range and does not need to be clipped, so go to Step 410.

Figure 9:
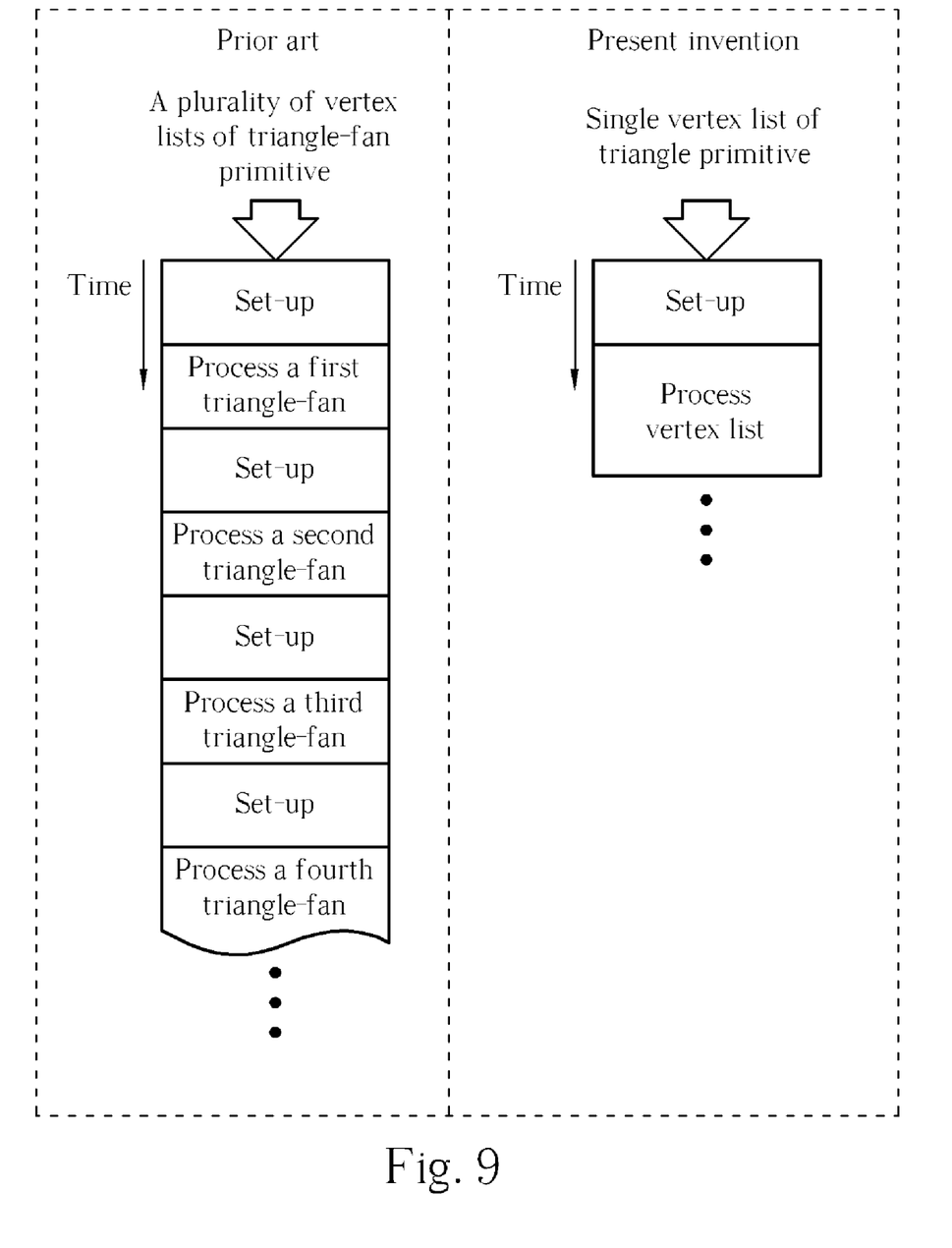
FIG. 9 shows a situation of improving performance in the present invention.

An advantage of the present invention can be shown through FIG. 9. Please refer to FIG. 9. FIG. 9 shows a performance difference in image processing between the present invention and the prior art. In the prior art (as in FIG. 4), clipped planes are represented with vertex lists according to triangle-fan primitives. However, the prior art wastes a good deal of time repeating the setup procedure before each vertex list is processed. As displayed in FIG. 9, a first vertex list is setup, and then a first triangle-fan is processed. Then, a second vertex list is setup before processing a second triangle-fan. After that, a third vertex list is setup, and then a third triangle-fan is processed, and so on. Since the prior art needs to process a plurality of vertex lists with triangle-fan primitives, the setup process is repeated many times. Therefore, the prior art is time consuming with poor image processing performance.

In comparison, the present invention integrates a plurality of triangle-fans from clipped planes and records vertices with one (or less than a number of triangle-fans) vertex list according to the triangle-list primitive. This greatly reduces a number of times required to execute the setup procedure during image processing, and hence improves image processing performance. As shown in FIG. 9, the present invention integrates vertex lists corresponding to the clipped planes to form one vertex list according to the triangle-list primitive. Therefore, only one setup procedure is required to be executed on the triangle-list primitive to process all vertices from the clipped planes. Since the number of times required to execute the setup procedure is reduced, the present invention increases image processing performance.

Figure 10:
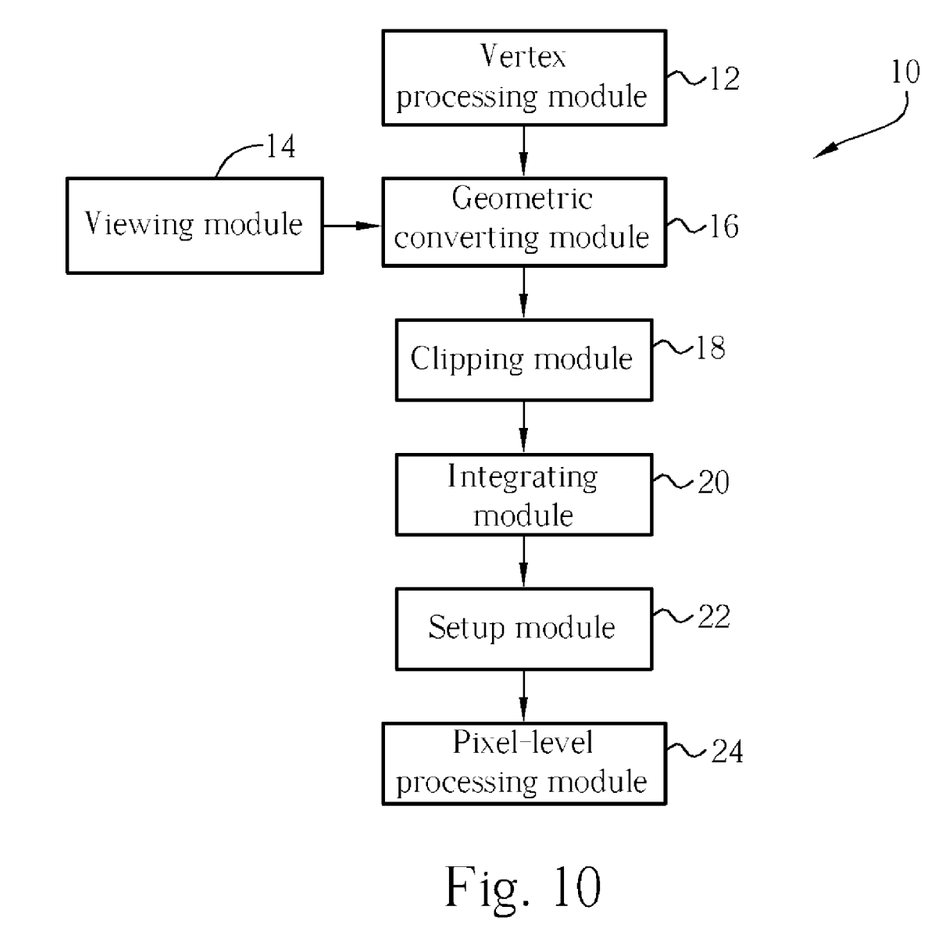
FIG. 10 is a functional block diagram of an electronic system for image processing in the present invention.

Please refer to FIG. 10 together with FIG. 7. The procedures described with reference to FIG. 7 and FIG. 8 can be realized in an electronic system 10 presented in FIG. 10. The electronic system 10 comprises a vertex processing module 12, a viewing module 14, a geometric converting module 16, a clipping module 18, an integrating module 20 for realizing the present invention, a setup module 22, and a pixel-level processing module 24. In the electronic system 10, the vertex processing module 12 realizes the vertex processing in Step 202 (FIG. 7). The viewing module 14 can setup a viewing range and boundaries, which enclose the viewing range, according to a virtual camera; the geometric converting module 16 executes Step 302 according to a relative setup of the viewing range. The clipping module 18 can realize Step 304, which clips objects and determines intersections of each triangular plane of the object and the boundaries of the viewing range for every object in the 3D space. If a plane intersects the boundary, the clipping module 18 can calculate an intersection of the plane and the viewing range, and also a clipped plane.

To realize the essence of the present invention, the integrating module 20 can realize Step 306, which is integrating clipped planes of a same object. If the clipping module 18 calculates a plurality of clipped planes after an object has been clipped, the integrating module 20 can record vertices of the plurality of clipped planes in a vertex list according to the triangle-list primitive to represent the vertices of the clipped planes. The setup module 22 can execute steps 308, 310, 312A/312B/312C, and 314, to receive vertex lists and establish a way to connect the vertices from the vertex lists to form planes according to the primitives of the vertex lists. The pixel-level processing module 24 can then execute Step 205, which is calculating pixels occupying the 2D screen for each plane from the vertex lists and color that should be presented by the pixels according to a setup from the setup procedure. For example, when presenting images in a virtual 3D world, an object can represent its texture by pasting images to the triangular planes, wherein the pixel-level processing module 24 performs this function.

Please refer to FIG. 111 with FIG. 10. The electronic system 10 in FIG. 10 can be realized by a computer system 30 shown in FIG. 11. The computer system 30 comprises a central processor 32, a bridging circuit 34, a memory 36 (such as a RAM), an image processing circuit 40, and a display device 42. The central processor 32 is used for controlling operations of the computer system 30, such as executing programs, processing information and data calculation. Program code, information, and data required by the central processor 32 during operation can be temporarily stored in the memory 36. The bridging circuit 34 is used for managing signal transmission of the central processor 32 and other circuits. The image processing circuit 40 can be integrated with the bridging circuit 34 in calculation circuitry in a same chipset. The display device 42 can be a liquid crystal display (LCD) or a Cathode-Ray Tube (CRT) display.

Figure 11:
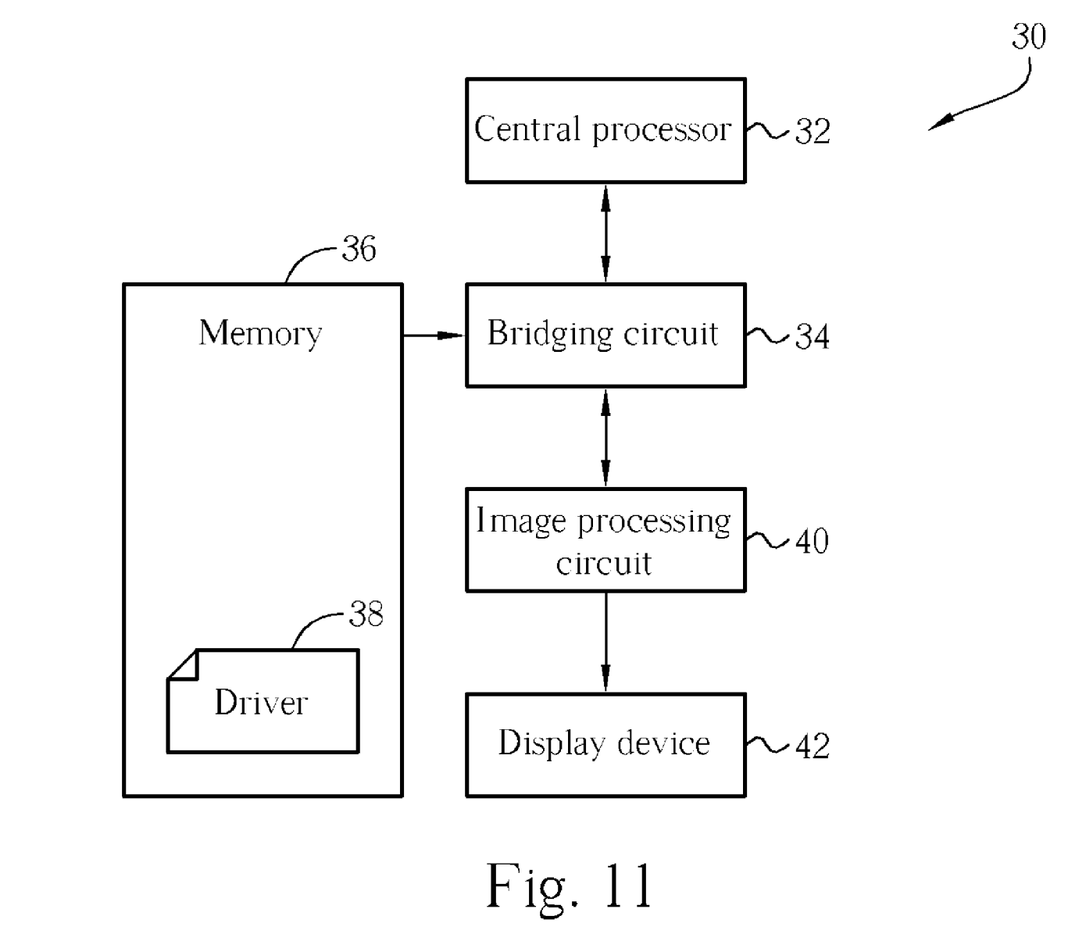
FIG. 11 is a functional block diagram of a computer system for image processing in the present invention.

Realizing the electronic system in FIG. 10, the central processor 32 executes a driver 38 corresponding to image processing to realize the vertex processing module 12, the viewing module 14, the geometric converting module 16, the clipping module 18, and the integrating module 20. The setup module 22 and the pixel-level processing module 24 are realized by the image processing circuit 40. 2D images generated from calculations done by the pixel-level processing module 24 can be displayed on the display device 42. In other words, functions of the vertex processing module 12, the viewing module 14, the geometric converting module 16, the clipping module 18 and the integrating module 20 can be performed by software, whereas functions of the setup module 22 and the pixel processing module 24 are realized with hardware (the image processing circuit).

Additionally, in the computer system 30, the image processing circuit 40 can be a display card independent from the bridging circuit 34; the image processing circuit 40 can have its own memory to achieve a more powerful calculation ability. In this case, the image processing circuit 40 can realize more modules of the electronic system 10, and is not limited to the setup module and the pixel-level processing module.

In summary, the present invention processes images in a 3D space using a more flexible triangle-list primitive to record a plurality of clipped planes from clipping in a vertex list. In comparison to the prior art, the present invention effectively reduces a number of vertex lists, and does not require repeating the setup procedure while reading the vertex lists. Therefore, time and system resources are freed up, and overall performance in image processing is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of image processing for projecting a three-dimensional (3D) image onto a two-dimensional (2D) screen in a computer system comprising a central processor, a bridging circuit, a memory, an image processing circuit, and a display device, wherein at least one object is formed with at least one plane existing in 3D space, the method comprising:

setting a viewing range and boundaries which enclose the viewing range;

the central processor causing clipping by checking if any face of the object intersects with the boundaries, and, if so, calculating an intersecting plane of the face and the viewing range, so that the intersecting plane is a clipped plane corresponding to the face, and each clipped plane has a plurality of vertices; and integrating by recording the plurality of vertices of the clipped planes in a same vertex list in accordance with a triangle-list primitive after performing clipping of the object and calculating at least one clipped plane, such that the vertices of the clipped planes are represented by the same vertex list.

2. The method of claim 1, wherein the vertex list of the triangle-list primitive in the integrating process is obtained from integrating and converting a vertex list of one or more triangle-fan primitives.

3. The method of claim 1, wherein the object is formed by at least one triangular plane.

4. The method of claim 1, further comprising:

the image processing circuit applying a setup procedure on the clipped planes of the object after the clipping process to receive the vertex list of each clipped plane, and setting up a way to connect vertices of the vertex list to form corresponding planes according to the triangle-list primitive corresponding to the vertex list;

wherein the vertex list generated by the integrating procedure is used for the setup procedure when in the setup procedure, so that connections between the different clipped planes can be set in the same setup procedure.

5. The method of claim 4, further comprising:

calculating a number of pixels on the 2D screen which are occupied by each plane and a color representation of each pixel according to the connected planes from the setup procedure.

6. The method of claim 1, wherein the integrating process is for dividing each clipped plane into triangular planes, and further for recording each vertex of each clipped plane in the same vertex list with a triangle-list primitive according to vertices of the triangular planes divided from the clipped plane.

7. A method of image processing which projects a three-dimensional (3D) image onto a two-dimensional (2D) screen in a computer system comprising a central processor, a bridging circuit, a memory, an image processing circuit, and a display device, wherein at least one object is formed with at least one plane existing in a 3D space, the method comprising:

setting a viewing range and boundaries which enclose the viewing range;

clipping by checking if any face of the object intersects with the boundaries, and, if so, calculating an intersecting plane of the object face and the viewing range, so that the intersecting plane is a clipped plane corresponding to the object face, and each clipped plane has a plurality of vertices; and the central processor causing integrating by recording each vertex of at least two clipped planes in a same vertex list after performing clipping for the object and calculating a plurality of clipped planes from the object, such that each vertex of the at least two clipped planes is represented by the same vertex list.

8. The method of claim 7, wherein recording each vertex of the at least two clipped planes in the same vertex list in the integrating process is performed in accordance with a triangle-list primitive.

9. An electronic device for image processing, which projects a three-dimensional (3D) image onto a two-dimensional (2D) screen;

wherein at least one object is formed with at least one plane existing in 3D space, the electronic device comprising:

a viewing module for setting a viewing range and boundaries which enclose the viewing range;

a clipping module for clipping by checking if any face of the object intersects with the boundaries, and if so, calculating an intersecting plane of the object face and the viewing range, so that the intersecting plane is a clipped plane corresponding to the object face, and each clipped plane has a plurality of vertices;

an integrating module for recording the vertices of all clipped planes in a same vertex list in accordance with a triangle-list primitive after performing clipping of the object and calculating at least one clipped plane from the object, such that vertices of the clipped planes are represented in the same vertex list; and a setup module circuit for applying a setup procedure to the clipped planes of the object after the clipping by the clipping module for further receiving the vertex lists of each clipped plane, and setting up a way to connect the vertices of the vertex list to form corresponding planes according to the triangle-list primitive that corresponds to the vertex list.

10. The electronic device of claim 9, wherein the object is formed with at least one triangular plane.

11. The electronic device of claim 9, wherein the vertex list generated by the integrating module is used for the setting module when the setting module is in operation so that the setting module sets connections between the different clipped planes according to the same vertex list.

12. The electronic device of claim 11, further comprising:

a pixel-level processing module configured to calculate a number of pixels on the 2D screen which are occupied by each plane and a color representation of each pixel according to the connected planes from the setup procedure.

13. The electronic device of claim 9, wherein the integrating module divides each clipped plane into triangles, and further records each vertex of each clipped plane in the same vertex list with the triangle-list primitive according to the vertices of triangular planes divided from the clipped plane.

* * * * *